United States Patent [19]

Sappok et al.

[11] Patent Number: 5,607,603
[45] Date of Patent: Mar. 4, 1997

[54] PROCESS AND APPARATUS FOR ELIMINATING CASTING DEFECTS ON THE SURFACE OF A CAST IRON BODY

[75] Inventors: Manfred Sappok, St. Tönis; Wolfgang Kleinkröger, Krefeld; Mohammad Sapahpour, Duisburg, all of Germany

[73] Assignee: Siempelkamp Giesserei GmbH & Co., Krefeld, Germany

[21] Appl. No.: 520,693

[22] Filed: Aug. 29, 1995

[30] Foreign Application Priority Data

Mar. 28, 1995 [DE] Germany ............... 195 11 302.0
Jun. 2, 1995 [DE] Germany ............... 195 20 323.2

[51] Int. Cl.⁶ ........................................ B23K 9/04
[52] U.S. Cl. .................. 219/76.14; 219/124.03; 219/137.71; 219/137 WM
[58] Field of Search ................ 219/76.14, 76.12, 219/76.15, 137 WM, 137.71, 124.02, 124.03, 125.12; 164/495, 496, 497

[56] References Cited

U.S. PATENT DOCUMENTS 2,191,476  2/1940  Hopkins.
3,891,821  6/1975  Evertz ................... 219/76.12
3,970,814  7/1976  Arnesen et al. ............. 219/76.15
3,978,311  8/1976  Toth ..................... 219/137.71
4,593,747  6/1986  Kelly et al. .................. 164/496
5,019,687  5/1991  Vogelmann ............... 219/76.14

FOREIGN PATENT DOCUMENTS 1240200  9/1962  Germany.
2537779  8/1975  Germany.
3320478A1  6/1983  Germany.

OTHER PUBLICATIONS

May 1946, Wertstratt and Betrieb, BECKER pp. 41 and 42.
"ARC AIR", Arc Air Company of Lancaster, Ohio, pp. 1–8., 1985.

Primary Examiner—Clifford C. Shaw
Attorney, Agent, or Firm—Herbert Dubno; Yuri Kateshov

[57] ABSTRACT

Cast-iron bodies are repaired or surface defects corrected by chambering the cast-iron body in the region of the defect and positioning the body with the resulting recess upwardly opening beneath a crane from which the head of an electrode advancing unit is suspended. The cast-iron electrode extends into the recess and is advanced automatically in accordance with detection of the arc length. The welding arc is struck to deposit weldment in the recess while the electrode is swung in a pendulum motion back and forth.

7 Claims, 1 Drawing Sheet

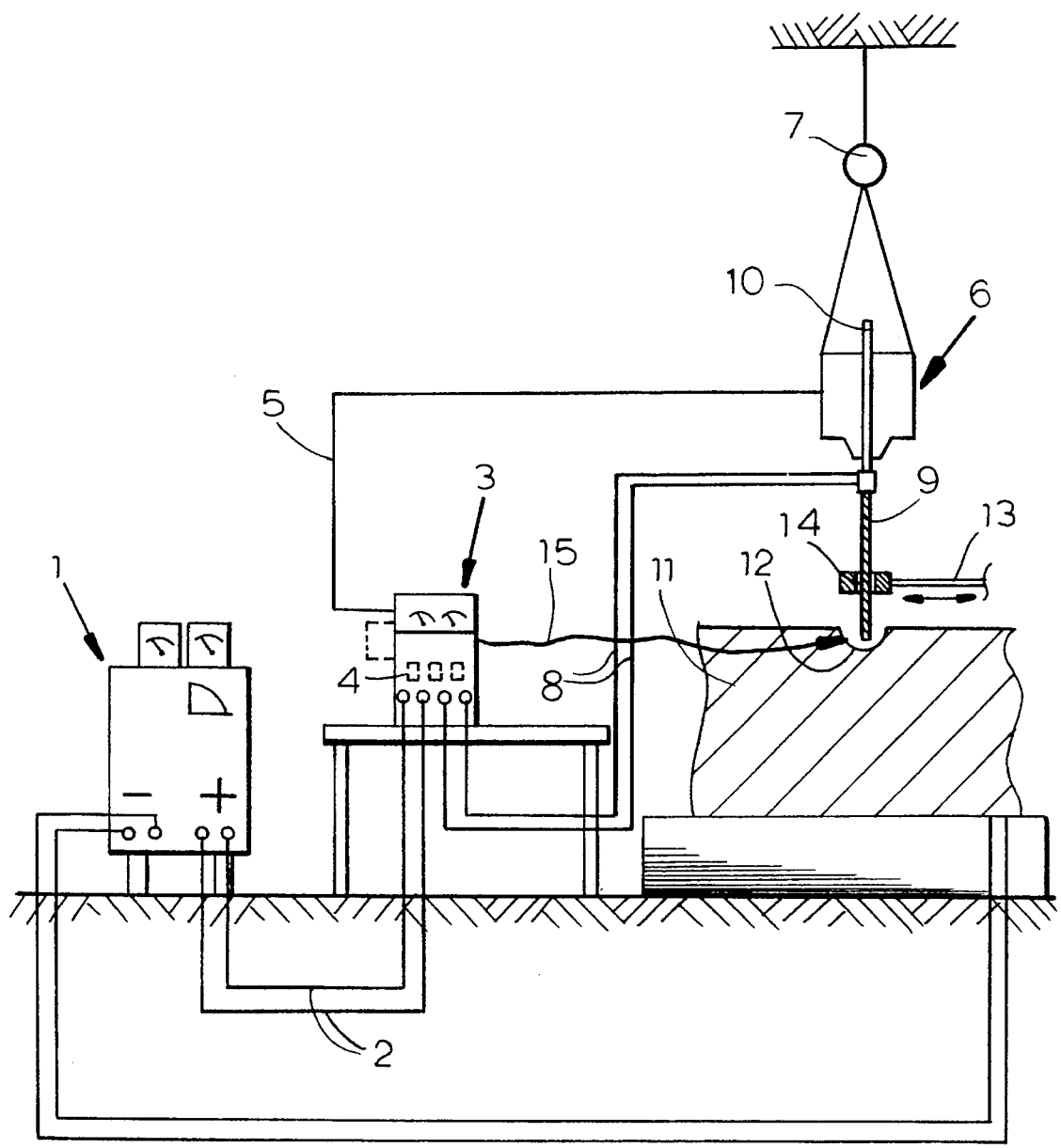

PROCESS AND APPARATUS FOR ELIMINATING CASTING DEFECTS ON THE SURFACE OF A CAST IRON BODY

FIELD OF THE INVENTION

Our present invention relates to a process and apparatus for eliminating casting defects on the surface of a cast body of cast iron, the defect repairs being effected by a finish welding or a repair welding.

BACKGROUND OF THE INVENTION

In the production of cast iron bodies, i.e. castings from cast iron and especially relatively large castings, it is common practice to eliminate defects at the surface of such bodies by a finish welding or a repair welding. A finish welding is intended to fill recesses or eliminate inclusions or fill crevices or weak points, cracks or the like which can be considered incomplete portions of the casting or which are defects in regions which may affect the invention.

Repair welding is used to cure breaks or the like which may occur in handling or may result during the casting process, or to restore structural integrity of a casting otherwise.

The castings with which the invention is primarily concerned are castings of graphitic cast iron and especially spherolitic cast iron.

The castings are generally heavy machined parts, such as machine frames, chassis, bases, columns and posts, motor housings and the like, but also radiation shielding transport storage containers which are used to receive irradiated fuel elements and other radioactive substances and the requirements for such articles are quite severe and thus casting defects which may affect integrity must be scrupulously avoided or cured.

As has been suggested it is known to attempt to eliminate casting defects on the surface of a cast article by electric arc welding utilizing welding electrodes which are denominated cast iron electrodes, by suitable adjustment of the welding parameters. The welding is in effect a deposition welding with hand control of the welding rod. The repairs thus made are seldom completely reliable and do not satisfy all of the requirements for structural integrity.

Electric welding systems are available which have been used for cutting, i.e. so-called electric arc cutting "torches" for automatic electrode feed and automatic control of the energy supply (see the paper entitled *Arc Air* of the Arc Air Company of Lancaster, Ohio, 11–85. The electrode is surrounded by a blast air which blows the melt as it is formed away from the crevice or slot which is cut in the workpiece. These automatic cutting units are not, however, suitable for eliminating the casting defects on the surface of cast iron objects and in fact can destroy such objects.

OBJECTS OF THE INVENTION

It is, therefore, the principal object of the present invention to provide a process and an apparatus for the elimination of casting defects of cast bodies of the type described, especially from the cast irons described, in both finish welding and repair welding, which will satisfy the need for high quality products and can largely be carried out automatically.

It is the object of this invention, moreover, to provide an improved process for depositing weldment on a cast iron body to cure casting defects thereof whereby drawbacks of prior art systems are avoided and whereby the repaired body can satisfy the most severe quality requirements.

Another object of the invention is to provide an apparatus for carrying out the improved process.

SUMMARY OF THE INVENTION

These objects and others which will become apparent hereinafter are attained, in accordance with the invention, by a process for correcting a casting defect on an outer surface of a cast iron body, especially a machine part, a motor housing or a storage and transport container for radioactive material composed of graphitic cast iron and preferably spherolitic cast iron, which comprises the steps of:

(a) recessing the body in a region of the casting defect so as to form a chamber open at the surface;

(b) preheating the body at least in the region to a preheating temperature of 400° to 700° C.;

(c) positioning the preheated body with the region below a cast-iron arc-welding electrode and suspending the electrode in a holder raisable and lowerable on a crane above the preheated body;

(d) axially advancing at least a portion of the electrode by an electric drive so that an end of the electrode reaches into the chamber;

(e) depositing weldment from the electrode in the chamber by an arc struck between the electrode and the body and automatically feeding the electrode with the drive in response to changes in length of the arc, thereby forming a melt bath of the weldment in the chamber with a composition substantially the same as that of the body;

(f) during deposition of the weldment in the chamber swinging the electrode back and forth under manual control by an actuating member acting upon the electrode; and (g) cooling and solidifying the bath to integrate the weldment with the body.

According to the invention, therefore, the casting is chambered in the region of the casting defect to form a recess which is open at the surface and into which the weldment can be deposited. The body is heated at least in the region of the chambered casting defect to the preheating temperature of 400° to 700° C.

The finish welding or repair welding is carried out as a same-type welding in the form of arc welding utilizing a cast-iron electrode. (The concept of "same type" welding will be discussed below.)

The cast body with the defect and recess turned upwardly is disposed beneath a crane with a lifting tool which can be raised and lowered and thus is suspended from the crane.

To guide the cast-iron electrode on the lifting tool, an electrically driven electrode feeder is used and the cast-iron electrode or a rod coaxial therewith and connected thereto to form part of the cast iron-electrode, is fed downwardly in the axial direction or raised and lowered to control the position of the cast-iron electrode in the axial direction.

The cast-iron electrode is thus moved with the crane so that the end of the cast-iron electrode is disposed in the chambered defect or recess and an electric arc is struck and the feed of the cast-iron electrode controlled automatically in accordance with changes in the length of the arc via the electrode feeder.

Finally, during the welding process, a service person swings the cast-iron electrode back and forth in a pendulum movement by a guide rod engaged with a cast-iron electrode.

The preheating temperature and the energy supplied during the welding process are so dimensioned that a sufficiently large melt path is formed in the recess that a same type welding results on cooling. For the present purposes of the application, "same type welding" signifies that during the welding process the weld that is formed has the same alloy composition as the cast body. The compositions of the weld and the cast body should coincide as exactly as possible. The composition of the cast-iron electrode should thus be selected to correspond to the composition of the cast body to be welded, preferably with a carbon excess. The cast-iron electrode also can be provided with a sheath or jacket for the same purpose, for example, a sheath predominantly consisting of carbon and silicon. If an electrode with a filling wire is used, the composition of the filling wire should also be selected to yield a weldment of the same composition and metallurgical structure as the cast body.

If desired, additives like slag formers can be added at the welding site.

When cast bodies of spherolitic cast iron are repaired, the elements required for crystallization of the spherolitic cast iron should also be supplied. It has been found to be advantageous to shield the melt bath against the influence of the temperature, preferably only by the slag which is formed and/or gases which are evolved. The gases can result from the cast-iron electrode and/or its sheath and/or a filling wire thereof.

According to a preferred embodiment of the invention, the cast-iron electrode used has a power corresponding to that of a cutting torch of the type described or a higher power, although this cast-iron electrode is operated free from blow-off air. such a cast-iron electrode can have, for example, a diameter of about 16 mm and the welding can be carried out with 800 to 1000 amperes by way of example. The power and thus the current amplitude depend upon the diameter of the cast-iron electrode and the length of the arc.

According to a feature of the invention, an automatic cutting torch welding unit is used with a guided electrode head and arc length control, but in the electrode head, a cast-iron electrode is provided, the electrode head is suspended by the crane and the electrode head is operated without the blast air. Furthermore, the cast-iron electrode is given a pendulum movement in the manner described.

Electrode feeders which are used in accordance with the invention can be thus employed for the cutting torches that have been described, such cutting torches being used in a ship construction for the separation of hull plates. In these systems, a carbon electrode is used in a burner head and has a thickness which determines the width of the kerf which is cut in the metal plates. A compressed-air nozzle is formed around the electrode in the burner head and the entire assembly is mounted on a slide which is movable at a rate determined by a controller. In these systems, the arc melts the metal and the molten metal is blown away. Only the electrode feeder and the burner head and control system of this apparatus is utilized for the present invention, the nozzle, blast air and carbon electrode being replaced by the cast-iron electrode of the invention.

The system can be made automatic by omitting the manual imparting of a pendulum operation and by providing an automatic control of the pendulum movement. This, however, increases the cost of the control system. It has been found to be advantageous with respect to the quality of the result to have a service person displace the cast-iron electrode in the pendulum movement since this allows visual inspection of the deposition of the weldment and enables the direction of the pendulum movement to be varied as required within the recess and around the periphery thereof.

Surprisingly, the manual control of the pendulum movement, combined with the automatic feed of the cast-iron electrode in response to changes in the length of the electric arc, enables the deposition of the weldment in a form which ensures a monolithic integration of the weldment in the cast-iron body. A single arc striking per repair can be used although, where necessary, multiple arc striking can be employed. A single arc striking per repair is, however, preferred.

BRIEF DESCRIPTION OF THE DRAWING

The above and other objects, features, and advantages will become more readily apparent from the following description, reference being made to the accompanying drawing, the sole FIGURE of which is a cross sectional view in highly diagrammatic form illustrating the principles of the present invention.

SPECIFIC DESCRIPTION

In the drawing, we have shown a welding power supply 1 which can be connected to the mains and is provided with the usual welding rectifier, the negative terminal of which can be connected to the cast-iron body. 11 to be mended.

From the welding rectifier 1, the usual high-current cable 2 extends to the control unit 3 with which the welding parameters can be set. While, in the embodiment shown, the electrode will be connected to the positive terminal, the equipment can be provided with switching for polarity reversal or the high current and ground cables can be switched to reverse polarity. In the illustration the cast-iron electrode is connected to the positive terminals as an anode.

The control unit 3 can be provided with a so-called contacter or switching unit which has been represented at 4 as is conventional for automated cutting-torch systems, e.g. of the arc air type described in the aforementioned copending publication.

The control unit is connected by a motor cable 5 to the electrode feeder 6 which can correspond to the electrode feeder of this torch. While the torch is provided with an air-blast unit at the feeder head, the feeder head 6 of this invention does not utilize an air blast.

The feeder head 6 is suspended, in turn, from the lifting tool 7 of a crane beneath which the body 11 of cast iron can be disposed.

The high-current cable 8 runs from the control unit 3 to the cast-iron electrode 9 which is advanced in the head 6. The latter may have an extension rod 10 which is fed through the electrode and has a composition such that the weldment deposited on the workpiece 11 will have the same lattice structure and composition as the cast iron of the workpiece.

The surface defect of the body 11 has been chambered to form a recess 12 axially below the cast-iron electrode 9.

During the welding process, the cast-iron electrode or rather its rod 9 is advanced automatically in response to the arc length. At the same time the electrode is swung like a pendulum on the crane by an operator utilizing a guide rod 13 which has an eye through which the cast-iron electrode 9 passes and which can be moved back and forth in the horizontal direction. A signal cable 15 provides information to the controller, e.g. as to arc length as may be required for control of the electrode feed.

After chambering the workpiece is positioned below the crane and the electrode is fed into the recess, an arc being struck to deposit the weldment in the recess to fill the latter. The pendulum movement ensures that the arc will play over the entire recess wall and guarantees full integration of the well filling to recess when the weldment cools. The weld is then often indistinguishable from the remainder of the cast-iron body.

We claim:

1. A process for correcting a casting defect on an outer surface of a cast iron body, comprising the steps of:
   (a) recessing said body in a region of said casting defect so as to form a chamber open at said surface;
   (b) preheating said body at least in said region to a preheating temperature of 400° to 700° C.;
   (c) positioning the preheated body with said region below a cast-iron arc-welding electrode and suspending said electrode in a holder raisable and lowerable on a crane above the preheated body;
   (d) axially automatically raising and lowering at least a portion of said electrode by an electric drive so that an end of said electrode reaches into said chamber;
   (e) depositing weldment from said electrode in said chamber by an arc struck between said electrode and said body and automatically feeding said electrode with said drive in response to changes in length of said arc, thereby forming a melt bath of said weldment in said chamber with a composition substantially the same as that of said body;
   (f) during deposition of the weldment in said chamber swinging said electrode back and forth under manual control by an actuating member acting upon said electrode; and
   (g) cooling and solidifying said bath to integrate said weldment with said body.

2. The process defined in claim 1 wherein said melt bath is shielded from atmospheric effects only by welding slag built up on the bath or by gases deriving from the cast-iron electrode, a sheath of the cast-iron electrode or a filling wire of the cast-iron electrode.

3. The process defined in claim 1 wherein welding with said cast-iron electrode is carried out with at least a power of an arc cutting torch without an air blast.

4. The process defined in claim 1 wherein the welding is carried out using a cutting torch head with arc-length control by suspending said head from said crane and substituting the cast-iron electrode for a cutting torch electrode and operating the cutting torch head without an air blast.

5. An apparatus for depositing a weldment in a recess formed by chambering a cast-iron body at a defect in a surface thereof, the recess being open upwardly, said apparatus comprising:

a crane above said body;

an electrode feed head suspended from said crane and provided with a cast iron electrode and means for feeding said electrode into said recess for axially raising and lowering said electrode automatically;

power supply means connected across said electrode and said body for striking an arc therebetween to effect deposition of a pool of weldment in said recess to cure said defect; and means responsive to changes in length of said arc for controlling said means for feeding.

6. The apparatus defined in claim 5, further comprising means for imparting a back and forth pendulum movement to said electrode during deposition of said pool of weldment.

7. The apparatus defined in claim 6 wherein said means for imparting a back and forth pendulum movement to said electrode includes a rod manually displaced by an operator and engaging said electrode.

* * * * *